United States Patent
Saxon et al.

(10) Patent No.: US 11,601,209 B2
(45) Date of Patent: Mar. 7, 2023

(54) MODELING RADIO WAVE PROPAGATION IN A FIFTH GENERATION (5G) OR OTHER NEXT GENERATION NETWORK

(71) Applicant: AT&T Intellectual Property I, L.P., Atlanta, GA (US)

(72) Inventors: Jeffrey B. Saxon, Rockwall, TX (US); Brian Lois, McKinney, TX (US); Abhay Dabholkar, Allen, TX (US); Muhammad Farooq Sabir, Allen, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 133 days.

(21) Appl. No.: 17/104,759

(22) Filed: Nov. 25, 2020

(65) Prior Publication Data

US 2022/0166530 A1    May 26, 2022

(51) Int. Cl.
    *H04W 4/00* (2018.01)
    *H04B 17/391* (2015.01)
    (Continued)

(52) U.S. Cl.
    CPC ......... *H04B 17/391* (2015.01); *G06N 3/0454* (2013.01); *H04B 17/318* (2015.01); *H04W 4/02* (2013.01)

(58) Field of Classification Search
    CPC ... H04W 28/04; H04W 72/04; H04W 72/042; H04W 88/08; H04W 4/02; H04L 5/0007;
    (Continued)

(56) References Cited

U.S. PATENT DOCUMENTS

| | | | |
|---|---|---|---|
| 8,359,157 B2 * | 1/2013 | Figueroa | G01C 21/3644 701/426 |
| 8,706,272 B2 * | 4/2014 | Lindahl | G10L 19/20 369/7 |

(Continued)

FOREIGN PATENT DOCUMENTS

| | | | | |
|---|---|---|---|---|
| CN | 109492580 A | * | 3/2019 | ........... G06K 9/0063 |
| CN | 111310720 A | * | 6/2020 | ............. G06F 30/27 |

(Continued)

OTHER PUBLICATIONS

Ma et al, A Practical Approach to Indoor Path Loss Modeling Based on Deep Learning, Journal of Computering Science and Engineering, vol. 15, No. 2, Jun. 2021, pp. 84-95. (Year: 2021).*

(Continued)

*Primary Examiner* — Phuongchau Ba Nguyen
(74) *Attorney, Agent, or Firm* — Amin, Turocy & Watson, LLP

(57) ABSTRACT

The technologies described herein are generally directed to modeling radio wave propagation in a fifth generation (5G) network or other next generation networks. For example, a method described herein can include based on a graphical representation of a layout of a geographic area, identifying, by equipment comprising a processor, a feature of the geographic area relevant to propagation of a signal propagated from a signal point on the layout, resulting in an identified feature. The method can further comprise based on the identified feature and the signal point, generating, by the equipment, a feature map for the geographic area by employing a neural network, wherein the feature map comprises a map depicting estimates of the propagation of the signal at locations within the geographic area.

20 Claims, 10 Drawing Sheets

(51) Int. Cl.
 *G06N 3/04* (2023.01)
 *H04W 4/02* (2018.01)
 *H04B 17/318* (2015.01)

(58) Field of Classification Search
 CPC ... H04B 17/391; H04B 17/318; G06N 3/0454
 See application file for complete search history.

(56) References Cited

U.S. PATENT DOCUMENTS

| | | | |
|---|---|---|---|
| 9,936,341 B1* | 4/2018 | Siris | G06F 16/951 |
| 10,528,542 B2* | 1/2020 | Banerjee | G06T 7/0002 |
| 11,373,092 B2* | 6/2022 | Piveteau | G06N 3/084 |
| 11,449,754 B1* | 9/2022 | Zhuo | G06N 3/08 |
| 2003/0083073 A1* | 5/2003 | Cossins | H04L 67/52 455/446 |
| 2004/0023666 A1* | 2/2004 | Moon | G06F 16/9537 455/427 |
| 2013/0147820 A1* | 6/2013 | Kalai | G01C 21/3889 345/522 |
| 2014/0313219 A1* | 10/2014 | Masselle | G06T 11/00 345/619 |
| 2015/0186413 A1* | 7/2015 | Zhu | H04L 67/1097 707/751 |
| 2017/0147905 A1* | 5/2017 | Huang | G06V 40/165 |
| 2019/0150006 A1* | 5/2019 | Yang | H04W 24/06 455/422.1 |
| 2022/0245936 A1* | 8/2022 | Valk | G06V 10/242 |

FOREIGN PATENT DOCUMENTS

| | | | | |
|---|---|---|---|---|
| CN | 113168891 A | * | 7/2021 | B33Y 50/00 |
| CN | 113963081 A | * | 1/2022 | G06F 30/12 |

OTHER PUBLICATIONS

Junkang et al, Attention Map-Guided Visual Explanations for Deep Neural Networks, MDPI, Applied Science, 12, 3846, Mar. 16, 2022, pp. 1-11. (Year: 2022).*
Levie et al, Radio UNet: Fast Radio Map Estimation with Convolutional Neural Networks, Dept. of Mathematics. LMU, Munich; Institute of Mathematics, TU, Berlin; Institute of Telecommunication Systems, TU Berlin; Dept. of Physics and Technology, University of Tromso, Dec. 23, 2020, pp. 1-24. (Year: 2020).*
Ronneberger, et al. "U-Net: Convolutional Networks for Biomedical Image Segmentation" arXiv:1505.04597v1 [cs.CV] May 18, 2015, 8 pages.
Isola et al. "Image-to-Image Translation with Conditional Adversarial Networks" arXiv:1611.07004v3 [cs.CV] Nov. 26, 2018, 17 pages.

* cited by examiner

MODELING RADIO WAVE PROPAGATION IN A FIFTH GENERATION (5G) OR OTHER NEXT GENERATION NETWORK

TECHNICAL FIELD

The subject application is related to implementation of fifth generation (5G) wireless communication systems or other next generation wireless communication systems, and, for example, placement of antennas used to implement next generation networks.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
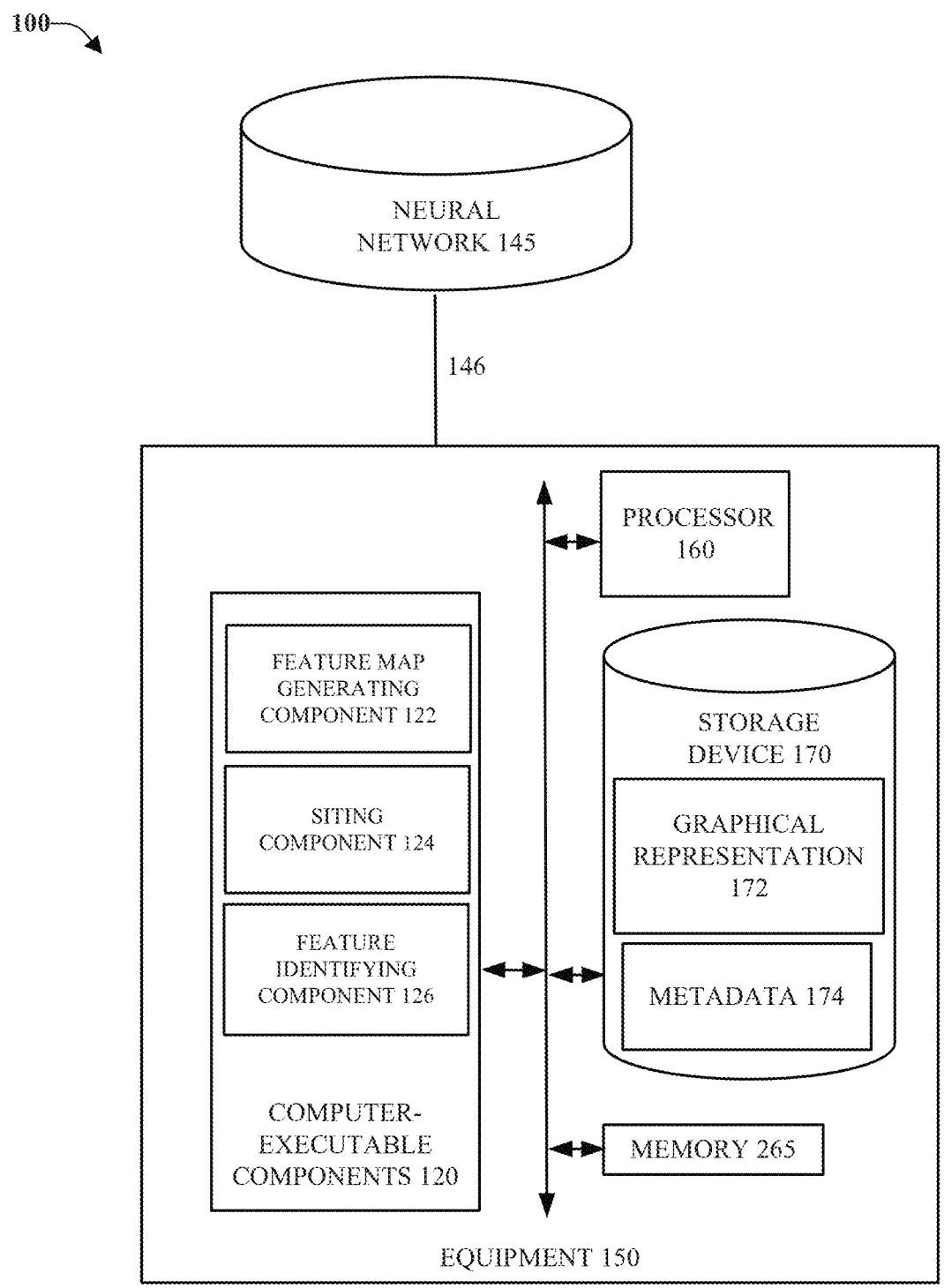
FIG. 1 is an architecture diagram of an example system that can facilitate modeling radio wave propagation, in accordance with one or more embodiments.

Generally speaking, one or more embodiments can facilitate modeling radio wave propagation. In addition, one or more embodiments described herein can be directed towards a multi-connectivity framework that supports the operation of New Radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

In describing one or more embodiments herein, the non-limiting terms "graphical representation of a layout of a geographic area" or simply "graphical representation," "aerial photograph," and "satellite photograph" can all be used to describe graphical input that can be used by one or more embodiments to provide a map depicting estimates of the propagation of the signal at locations within the geographic area. In addition to photographic inputs, in one or more embodiments, the graphical representation comprises a symbolic depiction of the layout of the geographic area from an overhead perspective.

The computer processing systems, computer-implemented methods, apparatus and/or computer program products described herein employ hardware and/or software to solve problems that are highly technical in nature (e.g., rapidly labeling parts of images based on different criteria), that are not abstract and cannot be performed as a set of mental acts by a human. For example, a human, or even a plurality of humans, cannot efficiently integrate wireless data receipt and demodulation (which generally cannot be performed manually by a human) and detailed analysis of information about a wireless connection, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate modeling radio wave propagation. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate modeling radio wave propagation, in accordance with one or more embodiments. More specifically, one or more embodiments can facilitate employing a deep machine learning process to model radio wave propagation based on graphical depictions of geographic areas. For purposes of brevity, description of like elements and/or processes employed in other embodiments is omitted.

System 100 can include equipment 150 coupled to neural network 145. As depicted, equipment 150 can include memory 165, processor 160, storage device 170, as well as other components to implement and provide functions for system 100, and other embodiments described herein. Computer executable components 120 can include instructions that, when executed by processor 160, can facilitate performance of operations defined by the executable component(s) and/or instruction(s), e.g., feature map generating component 122, siting component 124, feature identifying component 126, and additional components which can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, equipment 150 can further comprise various computer and/or computing-based elements described herein with reference to operating environment 1000 and FIG. 10.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 170 can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. As depicted and discussed in detail below, storage 170 includes graphical representations 172 (e.g., satellite imagery to be used for modeling of signal propagation) and metadata.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, graphical representations 172 can be received from other equipment for processing from a network link (not shown). Additionally, neural network 145 can be coupled to equipment 150 via a network link 146. According to one or more embodiments, network link 146 can be implemented by internet protocol (IP) networks Wi-Fi service networks, broadband service network, enterprise networks, cloud based networks, and the like. It should be noted that, although some components of diagrams discussed herein depict what could be termed a direct connection between equipment, this depiction can also represent communicative coupling of equipment via other network equipment not shown in the figures.

In one or more embodiments, computer and/or computing-based elements 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining feature identifying component 126. In one or more embodiments, feature identifying component 126 can, identify in graphical representation 172 of a layout of a geographic area a feature of the geographic area relevant to propagation of a signal propagated from a signal point on the layout.

Example features that can be identified based on analysis of graphical representation 172 include various geographic information systems (GIS) features. One having skill in the relevant art(s), given the disclosure herein, would appreciate the variety of geographic features that are relevant to propagation of a signal, e.g., natural features (topography of the surface of the geographic area, and manufactured features, e.g., roads and buildings. An example graphical representation of a geographic area is discussed with FIG. 3 below.

In an additional example, in one or more embodiments, computer executable components 120 can include instructions that, when executed by processor 160, can facilitate performance of operations defining feature map generating component 122. In one or more embodiments, feature map generating component 122 can facilitate generating a feature map for a geographic area by employing neural network 145 to analyze information including graphical representation 172, the identified GIS feature, and metadata 174 about graphical representation 172. In some implementations, the generate feature map can be a map depicting estimates of the propagation of signal at locations within the geographic area depicted by graphical representation 172. The generation of feature maps and the configuration and operation of neural networks such as neural network 145 is discussed with FIGS. 2-6 below.

Figure 2:
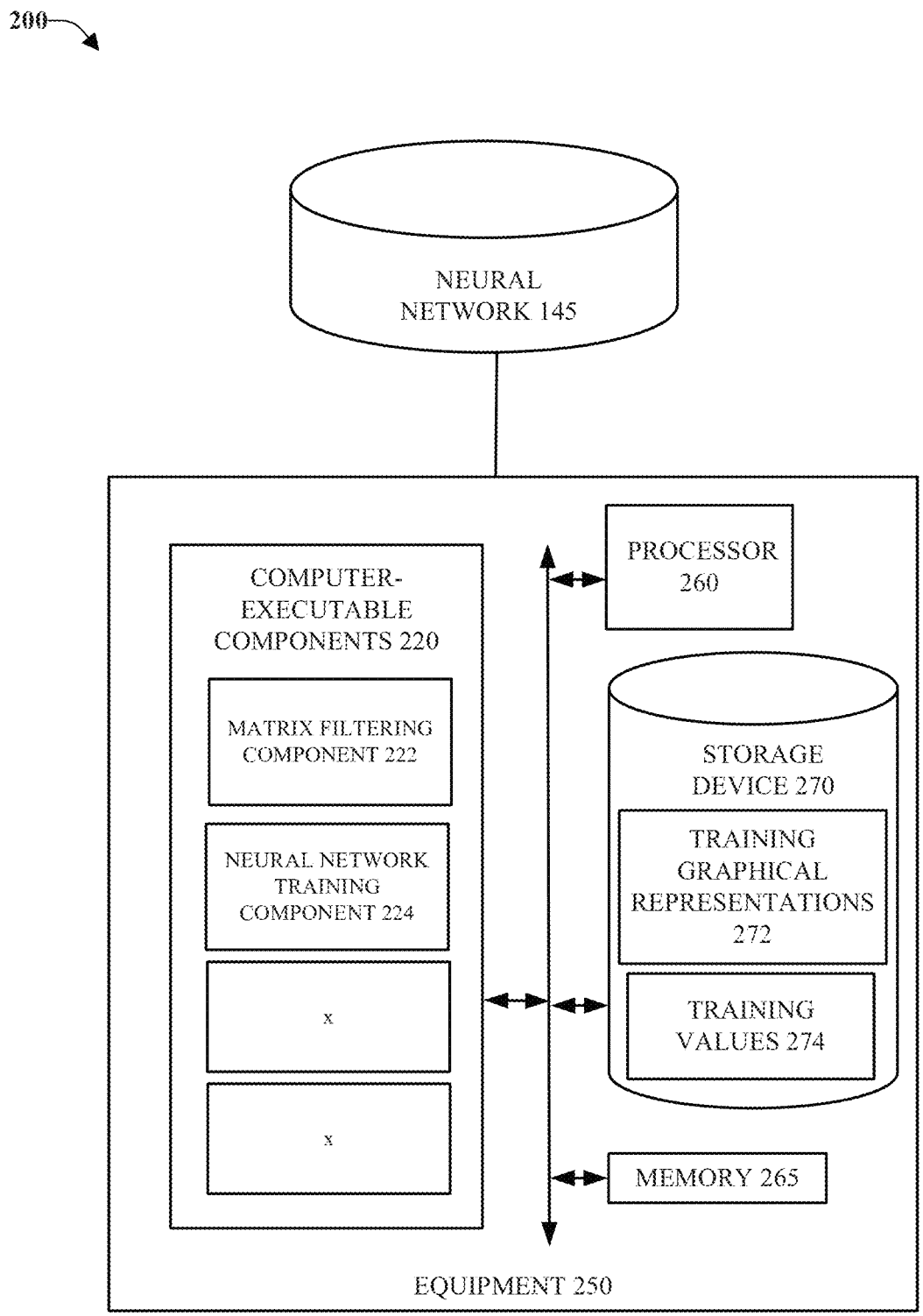
FIG. 2 is a diagram of a non-limiting example system for facilitating the configuration and operation of neural network 145, in accordance with one or more embodiments.

FIG. 2 is a diagram of a non-limiting example system 200 for facilitating the configuration and operation of neural network 145, in accordance with one or more embodiments. For purposes of brevity, description of like elements and/or processes employed in other embodiments is omitted.

System 200 can include equipment 250 coupled to neural network 145. As depicted, equipment 250 can include memory 265, processor 260, storage device 270, as well as other components to implement and provide functions for system 100, and other embodiments described herein. Computer executable components 120 can include instructions that, when executed by processor 160, can facilitate performance of operations defined by the executable component(s) and/or instruction(s), e.g., matrix filtering component 222, neural network training component 224, and any additional components which can improve the operation of system 200. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, equipment 250 can further comprise various computer and/or computing-based elements described herein with reference to operating environment 1000 and FIG. 10.

Similar to memory 165 discussed above, in some embodiments, memory 265 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 365 are described below with reference to system memory 1006 and FIG. 10. Such examples of memory 365 can be employed to implement any embodiments of the subject disclosure.

According to multiple embodiments, processor 260 can comprise one or more processors and/or electronic circuitry that can implement one or more computer and/or machine readable, writable, and/or executable components and/or instructions that can be stored on memory 365. For example, processor 260 can perform various operations that can be specified by such computer and/or machine readable, writable, and/or executable components and/or instructions including, but not limited to, logic, control, input/output (I/O), arithmetic, and/or the like. In some embodiments, processor 360 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 260 are described below with reference to processing unit 1004 of FIG. 10. Such examples of processor 260 can be employed to implement any embodiments of the subject disclosure.

In one or more embodiments, computer and/or computing-based elements 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining matrix filtering component 222.

In an example implementation, neural network 145 can comprise a convolutional neural network that can provide results according to a deep machine learning process, e.g., discussed below with FIGS. 3-7. With respect to this convolutional neural network, in one or more embodiments, matrix filtering component 222 can apply a filter to convolute data corresponding to the graphical representation and the identified feature, resulting in a matrix of weighted values, with the filter being based on the propagations of signals in conditions indicated by graphical representations 272. In approach to generating a feature map (e.g., by feature map generating component 122) is to combine features from the matrix of weighted values with the graphical representation, e.g., overlay the features indicated by the weighted values over graphical representation 172.

In another example, in one or more embodiments, computer executable components 220 can include instructions that, when executed by processor 260, can facilitate performance of operations defining, neural network training component 224. As would be appreciated by one having skill in the relevant art(s), given the description herein, neural network 145 can be a broadly considered to be a function approximator. For example, given a series of training inputs paired with training outputs, neural network 145 is trained to determine a function that can pair the training input values and output values in the same way that was specified by the training data.

In some implementations, machine learning approaches can be used to select functions for a variety of data such that, when accessed by one or more embodiments described, e.g., train a neural network to link inputs with outputs. Thus, returning to the example implementation of neural network training component 224, in some implementations, training graphical representations can be used to train neural network 145, to be paired with training values 274. In this example, training values 274 can be signal propagation values associated with corresponding training graphical representations 272. Once trained (e.g., once machine learning approaches are used to estimate a function linking training graphical representations 272 with training values 274), neural network 145 can be used to facilitate operations by feature map generating component 122.

For example, feature map generating component 122 can provide an input to neural network 145 that is similar to the input data used to train neural network 145, e.g., graphical representation 172 can be similar to training graphical representations 272 used to train neural network 145. Based on graphical representation 172, neural network can provide propagation information from training values 174, e.g., by applying the estimated function of neural network 145 to the graphical representation 172 input.

In yet another example, in one or more embodiments, computer executable components 120 can include instructions that, when executed by processor 160, can facilitate performance of operations defining siting component 124. In one or more embodiments, siting component 124 can, based on the feature map generated by feature map generating component 122 and graphical representation 172, estimate the propagation of a signal propagated from a signal point identified in graphical representation 172. Siting component 124 can further, based on the estimated propagation of the signal, estimate a value corresponding to the propagation of the signal to an identified point on graphical representation 172. Both signal points and identified points for receiving a signal are discussed with FIG. 3 below.

Figure 3:
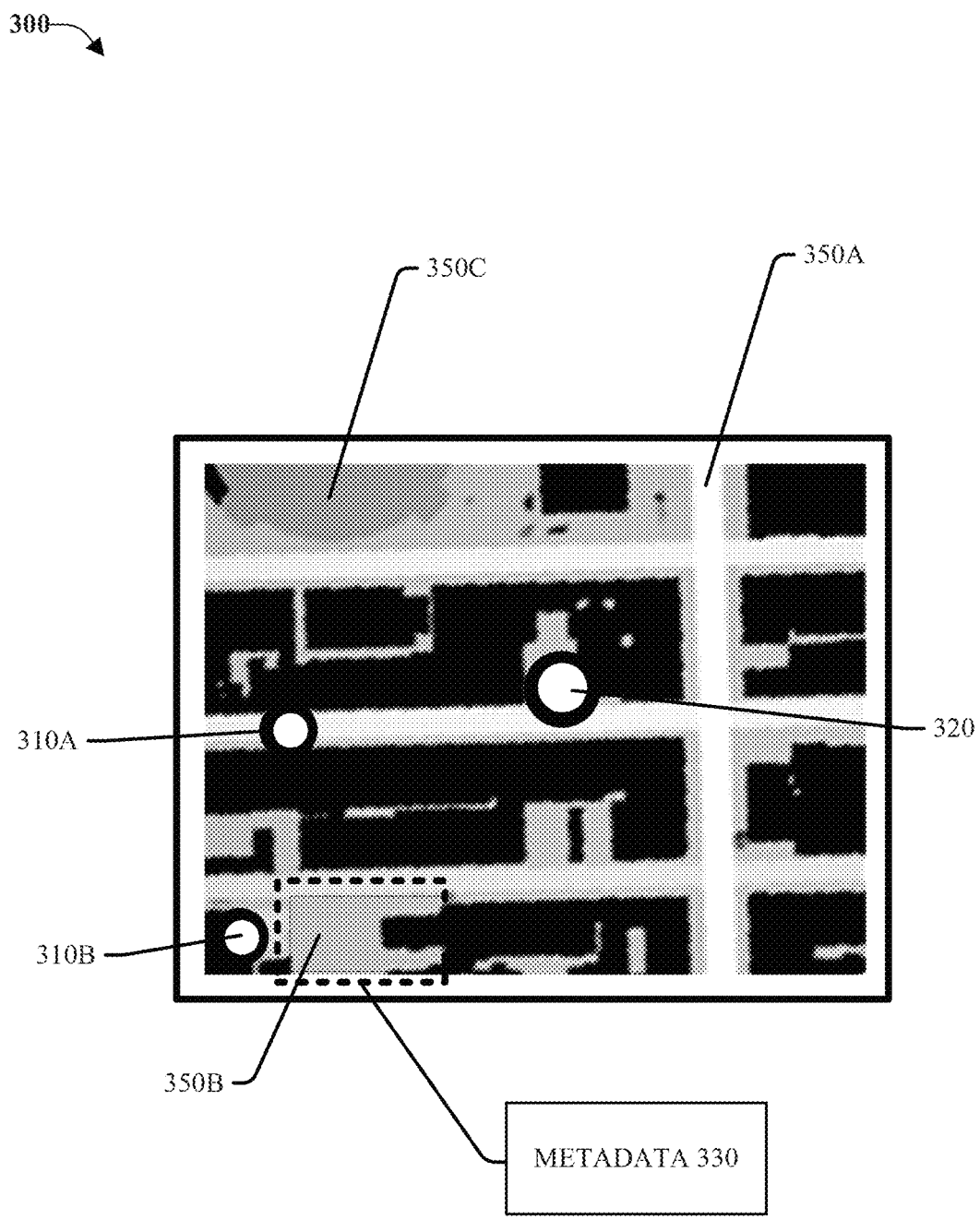
FIG. 3 is a diagram of a non-limiting graphical representation for facilitating the modeling of signal propagation in a geographic area, in accordance with one or more embodiments.

FIG. 3 is a diagram of a non-limiting graphical representation 300 for facilitating the modeling of signal propagation in a geographic area, in accordance with one or more embodiments. For purposes of brevity, description of like elements and/or processes employed in other embodiments is omitted. Graphical representation 300 includes GIS features 350A-C, signal point 320, and receiving points 310A-B, in accordance with one or more embodiments. In one or more embodiments, as discussed below, can predict path losses for transmitters within dense environments, e.g., as depicted by graphical representation 300.

Returning to the discussion of computer-executable components 120, in one or more embodiments, computer executable components 120 can include instructions that, when executed by processor 260, can facilitate performance of operations defining, siting component 124. In one or more embodiments, based on the feature map and the graphical representation, siting component 124 can estimate the propagation of the signal propagated from a signal point, resulting in an estimated propagation of the signal to the geographic area.

One approach described herein can employ types of deep neural network structures to estimate the path loss for a given reference point across a bounding area. The estimation will function on an individual transmitter location that has already been identified and labeled in a graphical representation of the area. The broad approach to implementing one or more embodiments includes the following:

Identify area of impact within graphical representation 300. One or more embodiments can predict outputs across a set area surrounding the location of the emitter, and a bounding region can be defined for this area. For example, signal point 320 can be a potential site for placement of base station equipment. Based on the feature map generated from the neural network 145, the estimated propagation of a signal from signal point 320 can be generated.

Extract GIS features from graphical representation 300. Within the bounding region, GIS features can be extracted from the content of the image and from master datasets covering a region associated with the graphical representation. This features can include, but are not limited to, terrain elevation, clutter classification, clutter height, satellite imagery, etc.

As discussed above, graphical representation 300 generally depicts a geographic area, e.g., an area to be analyzed for selection of sites for placement of base station equipment. As would be appreciated by having skill in the relevant art(s), given the description herein, graphical representation 300 depicts an overhead image of a geographic location (e.g., a satellite or aerial photograph), with various GIS features that can be identified. For example, based on color, shape, and placement, GIS feature 350A can be determined by one or more embodiments to be a street in an urban setting. In another example, based on color, shape, and placement, GIS feature 350B can be determined by one or more embodiments to be a natural, topographical feature, e.g., a hill. Further, based on color, shape, and placement, GIS feature 350B can be determined by one or more embodiments to be a man-made feature, e.g., some type of building.

With reference to GIS feature 350B being a building, it can be useful for one or more embodiments to consider the height of the building. For example, building height can be a determining factor in assessing signal propagation in a similar environment, e.g., considering 'clutter' in a geographic area. To facilitate analysis of this factor, along with other factors discussed herein, one or more embodiments can consider metadata 330, e.g., information describing aspects of the geographic area corresponding to a photographic section of the graphical representation. In other embodiments, other factors associated with a geographic area that can affect signal propagation can be included with graphical representation 300 as metadata 330.

In one or more embodiments, neural network 145 can be used to estimate propagation characteristics (e.g., path loss) at points on graphical representation 300. In some implementations of this approach, a trained neural network 145 can be provided with the extracted/preprocessed GIS features, along with any relevant non-GIS features. In some embodiments, the output of this is can be a raster of the overall bounding region identifying the path loss at each point, e.g., a feature map of the geographic area.

In one or more embodiments, computer executable components 120 can include instructions that, when executed by processor 160, can facilitate performance of operations defining siting component 124. In one or more embodiments, siting component 124 can, based on the feature map generated by feature map generating component 122 and graphical representation 300, estimate the propagation of a signal propagated from a signal point identified in graphical representation 300. Siting component 124 can further, based on the estimated propagation of the signal, estimate a value corresponding to the propagation of the signal to an identified point on graphical representation 300. Both signal points and identified points for receiving a signal are discussed with FIG. 3 below. In one or more embodiments, based on the feature map described herein, siting component 124 can estimate a value corresponding to the propagation of the signal to an identified point on the layout, e.g., reception points 310A-B.

Figure 4:
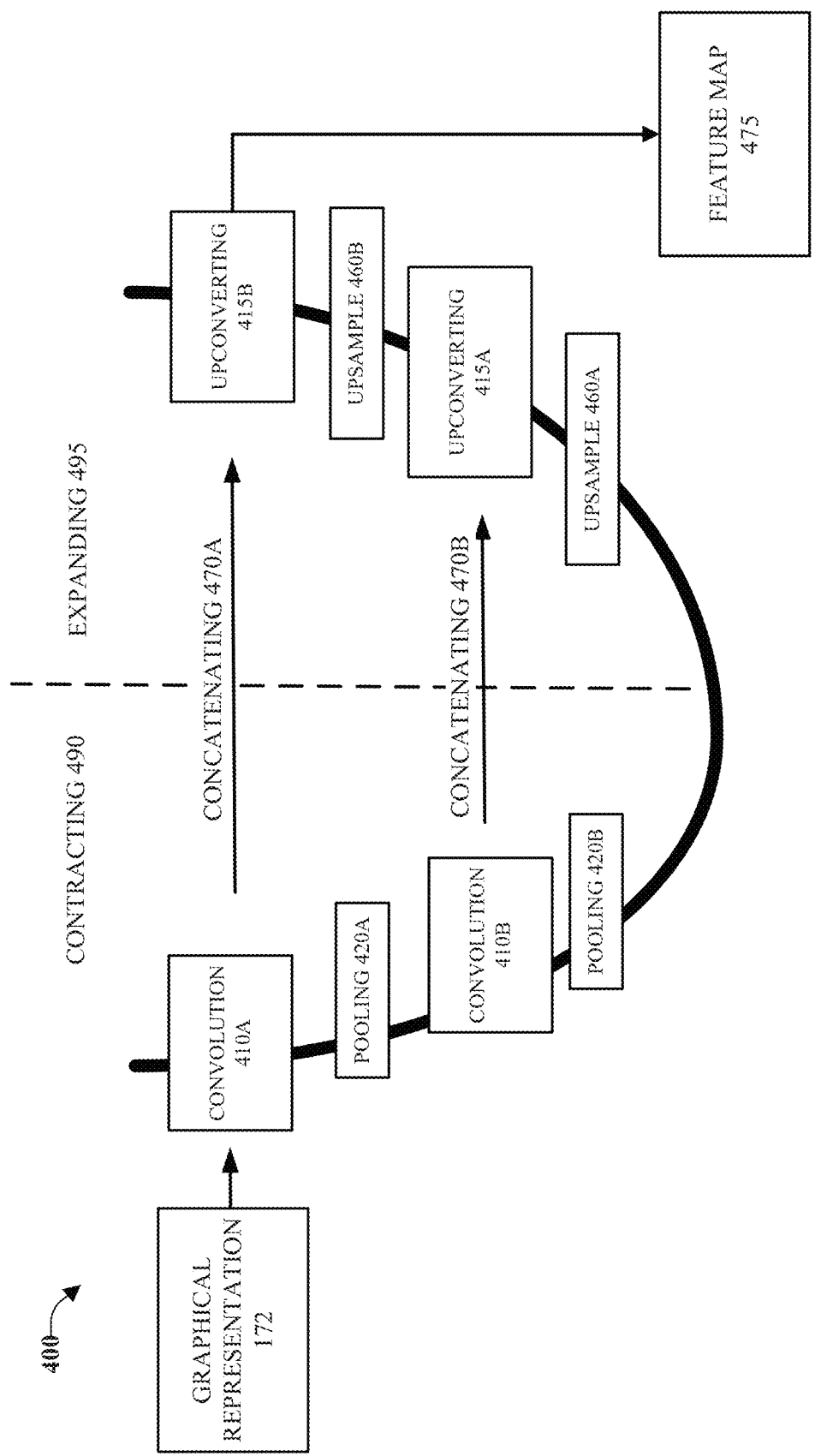
FIG. 4 depicts a flow diagram of an example approach to utilizing a convolutional neural network to model signal propagation, in accordance with one or more embodiments.

FIG. 4 depicts a flow diagram of an example approach to utilizing a convolutional neural network 400 to model signal propagation, in accordance with one or more embodiments. For purposes of brevity, description of like elements and/or processes employed in other embodiments is omitted.

In some implementations, convolutional neural network 400 can be characterized as an image to image type of neural network, meaning that an image can be used as all or part of the input to the neural network and an image can be output from the neural network as a result of the input and the training of the neural network. To accomplish the image to image function of convolutional neural network 400, the structure depicted in FIG. 4 can be used. As depicted this structure, which can be termed a u-net can perform semantic image segmentation, e.g., in embodiments described herein, this can be labeling ones or groups of pixels with labels that characterize their signal propagation characteristics.

To perform this segmentation, the structure depicted can have a contracting phase 490 and an expanding phase 495. In contracting phase 490, convolutional neural network 400 can receive graphical representation 300. As noted above, a preprocessing stage can identify and position (e.g., center) signal point 320 in the image to be analyzed, e.g., so filters applied can analyze characteristics of signal propagation radiating from the identified point. It should be noted that, at each contracting stage discussed below, graphical representation is convoluted such so as to identify more types of graphical regions, while reducing the identification of where the different types appear in graphical representation 300, e.g., the representations are contracted to have more "what" and less "where."

As depicted, for each filtering phase, the identified features in graphical representation 300 can be extracted and moved to the next filtering phase. For example, after filtering by convolution 410A, pooling 420B can reduce the size of the graphic analyzed by convolution 410B, e.g., resulting in a matrix of weighted values. In one or more embodiments, this reduction in size goes with an expansion (e.g., doubling) of the number of filters (e.g., channels or feature channels) applied, e.g., from 64 filters applied by convolution 410A to 128 filters applied by convolution 410B.

Looking in more detail at a first contracting function, convolution 410A can apply a one or more filters to graphical representation 300 to identify certain types of pixel or groups of pixels. For example, GIS features 350A-C of FIG. 3 can be identified (e.g., by color and shape) as having particular propagation characteristics, e.g., GIS feature 350B can be identified as a street, and with this identification, the pixel of this street can be labeled as having a propagation characteristic, e.g., a low level of signal decay. In different embodiments, one or more labels can be applied to mark the level of propagation delay, with a granularity selected to provide data with a certain level of detail, e.g., signal decay ranging from zero (e.g., minimal) to ten (e.g., a maximum amount).

During this first convolution stage, a certain level of filtering can be applied (e.g., 64 filters) to look for broad features, e.g., a non-specific obstruction, natural or man-made. In later applications of filters (e.g., convolution 410B), the identified obstruction can be further filtered to more specifically identify the obstruction, e.g., GIS feature 350C (e.g., a building) or GIS feature 350B (e.g., a hill or other natural obstruction). Different implementations of contracting phase 490 can apply as many applications of filters as required for a particular application.

As noted above, throughout contracting phase 490 localization information for identified features is removed from the representation. In the expanding stage 495, this contracted collection of labels can be expanded (e.g., upsampling 460A-B and upconverting 415A-B) and concatenated 470A-B with a similarly sized feature maps from the contracting path, e.g., enabling precise localization combined with contextual information from the contracting path. Thus, in one or more embodiments, the results of the expanding phase 495 is a feature map overlaid on to a corresponding portion of graphical representation 300, e.g., a color-coded overlay of graphical representation 300, depicting colors that reflect signal propagation characteristics of the geographic area (not shown).

Figure 5:
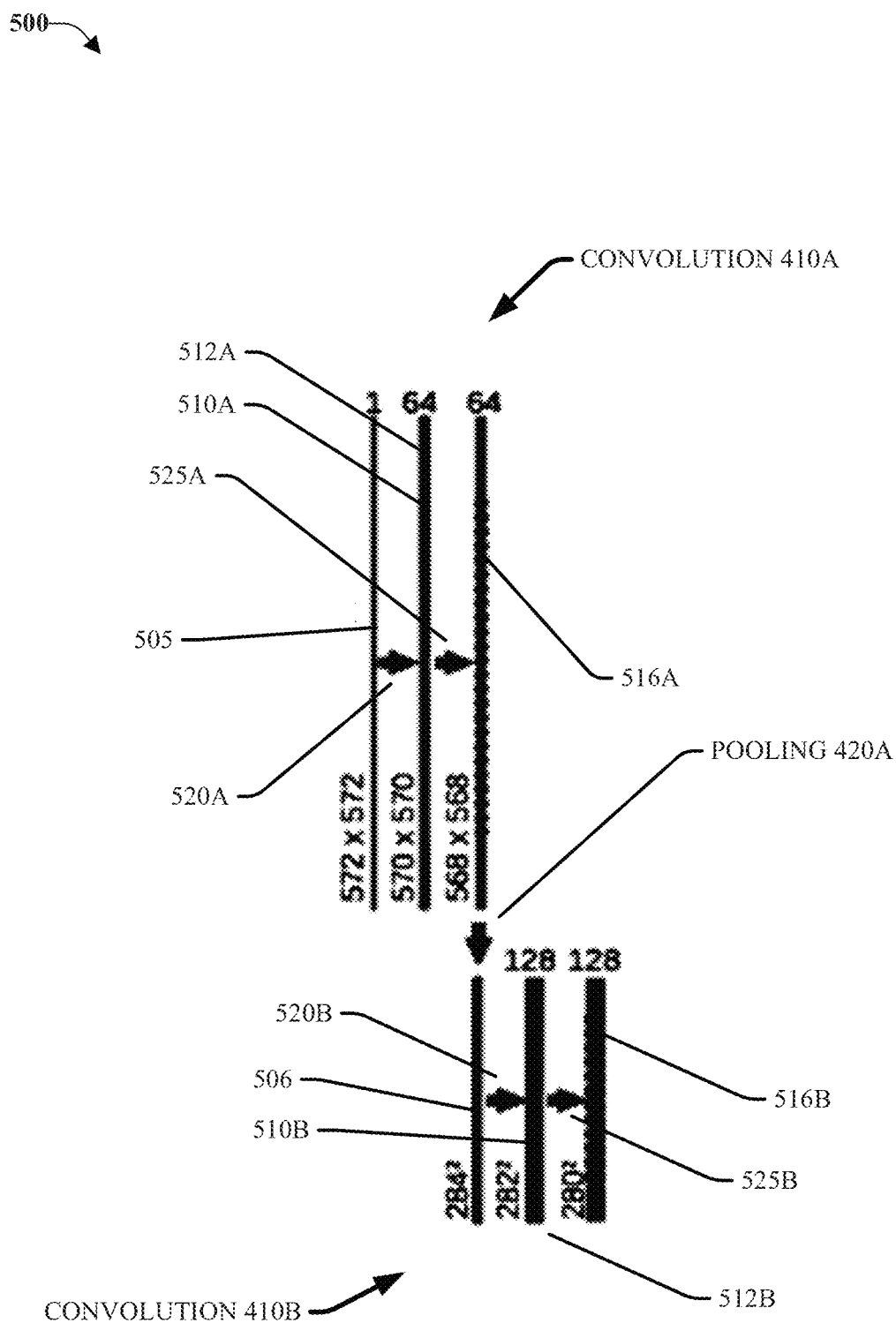
FIG. 5 depicts, for an example convolutional neural network, a more detailed view of aspects of the example approach detailed with FIG. 4, in accordance with one or more embodiments.

FIG. 5 depicts, for an example convolutional neural network, a more detailed view 500 of aspects of the example approach detailed with FIG. 4 above, in accordance with one or more embodiments. For purposes of brevity, description of like elements and/or processes employed in other embodiments is omitted.

Detailed view 500 includes symbolic representations of convolution 410A and pooling 410B discussed with FIG. 4 above. Image 505 corresponds to an input image, e.g., graphical representation 300. For convolution 410A, as depicted, image 505 initially has a single channel, and can be convoluted 520A by filter 512A with 64 channels, resulting 525A in matrix of weighted values 516A with 64 channels. To contract the result and expand the depth of the channels included, pooling 420A can reduce the size of feature map 516A (e.g., by a factor of 3), and double the channels of image 506 to 128. For convolution 410B, as depicted, image 506 with 128 channels from pooling 420A, can be further convoluted 520B by filter 512B with 128 channels, resulting 525B in matrix of weighted values 516B with 128 channels.

Figure 6:
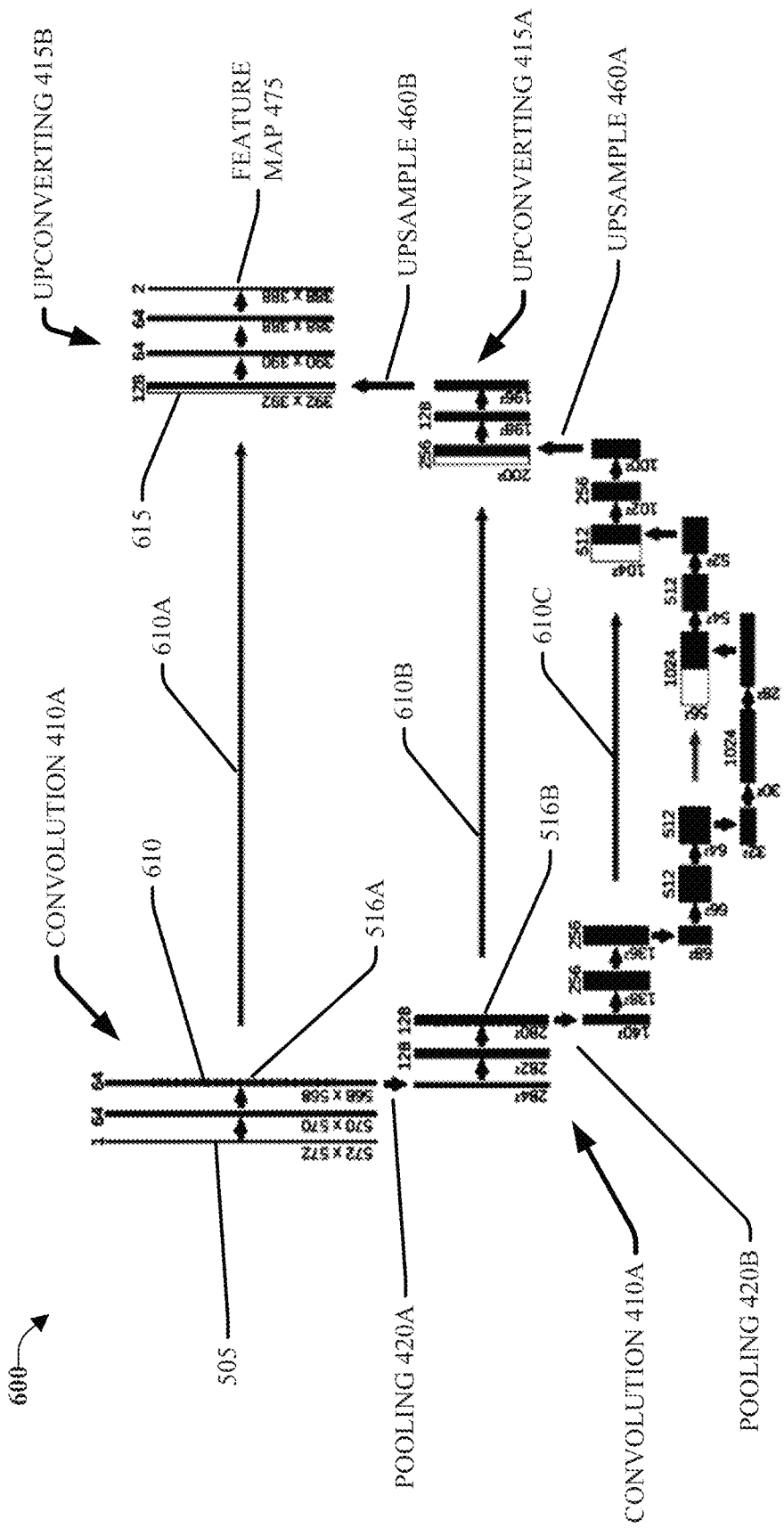
FIG. 6 depicts, for an example convolutional neural network, a more detailed view of the example approach detailed with FIG. 4, in accordance with one or more embodiments.

FIG. 6 depicts, for an example convolutional neural network, a more detailed view 600 of the example approach detailed with FIG. 4 above, in accordance with one or more embodiments. For purposes of brevity, description of like elements and/or processes employed in other embodiments is omitted.

One having skill in the relevant art(s), given the description herein, would appreciate that detailed view 600 includes labels for the elements discussed with FIG. 4 above, along with additional labeled operations. As described with FIG. 2 above, an approach to generating feature map 475 (e.g., by feature map generating component 122) is to concatenate 610A-B features from matrix of weighted values 516A-B with to the result of upsampling 460B-A, respectively.

Figure 7:
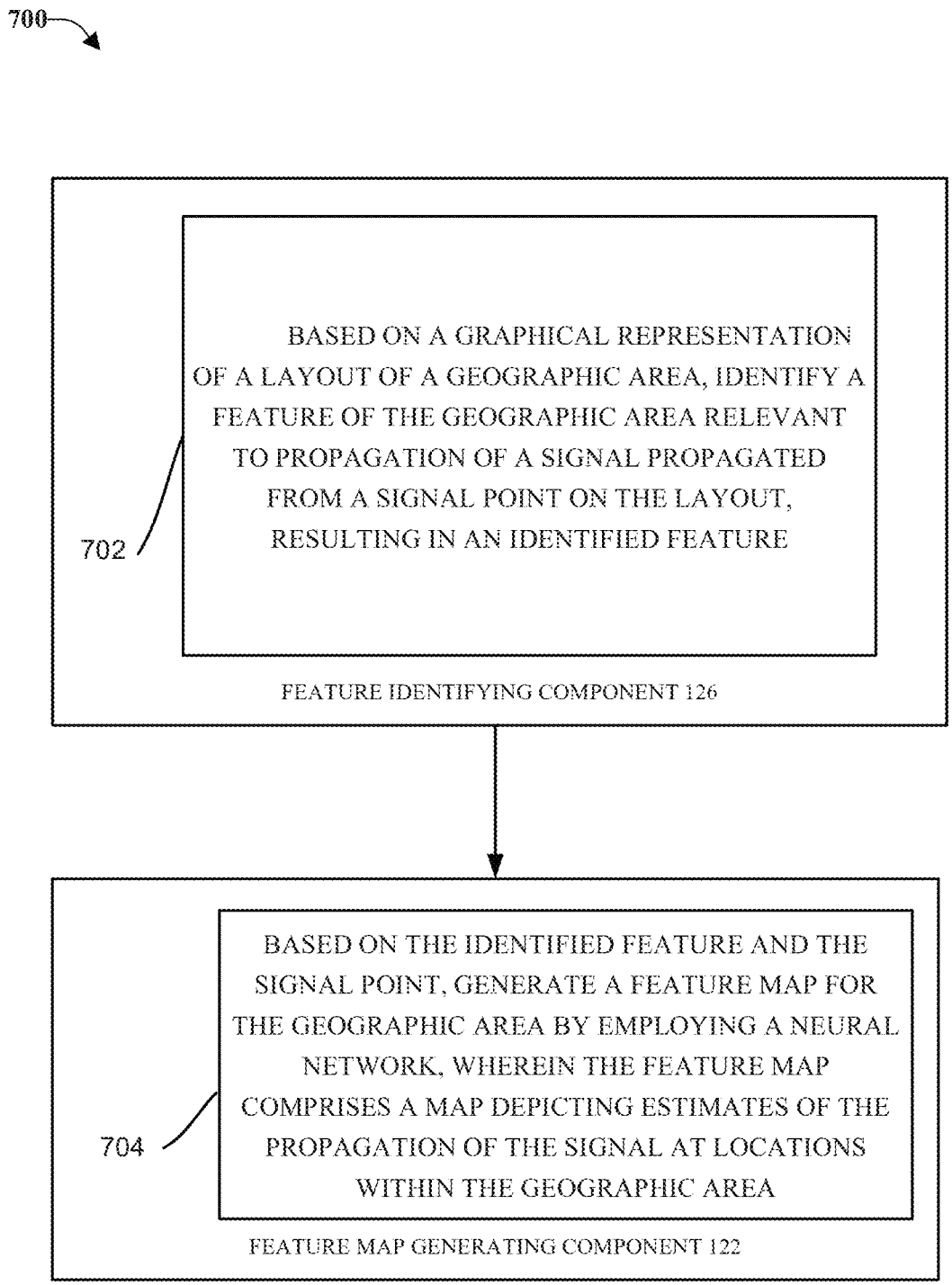
FIG. 7 illustrates an example system that can facilitate modeling signal propagation from a signal point on a graphical representation, in accordance with one or more embodiments.

FIG. 7 illustrates an example system 700 that can facilitate modeling signal propagation from a signal point on a graphical representation, in accordance with one or more embodiments. For purposes of brevity, description of like elements and/or processes employed in other embodiments is omitted.

As depicted, system 700 includes feature identifying component 126 and feature map generating component 122. In one or more embodiments, feature identifying component 126 can be configured 702 to, based on a graphical representation of a layout of a geographic area, identify a feature of the geographic area relevant to propagation of a signal propagated from a signal point on the layout, resulting in an identified feature.

In one or more embodiments, feature map generating component 122 can be configured 704 to, based on the identified feature and the signal point, generate a feature map for the geographic area by employing a neural network, wherein the feature map comprises a map depicting estimates of the propagation of the signal at locations within the geographic area.

Figure 8:
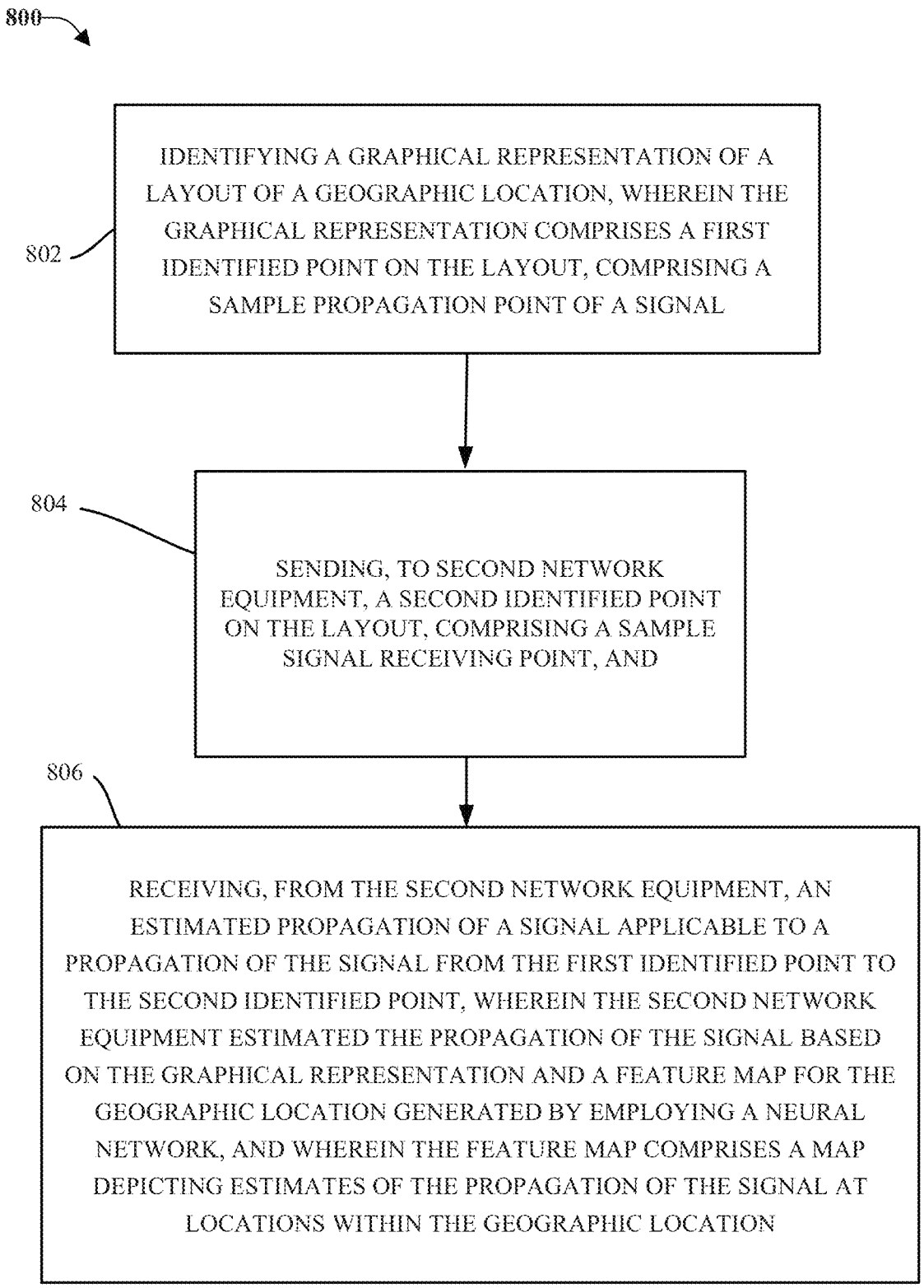
FIG. 8 illustrates an example method that can facilitate modeling signal propagation from a signal point on a graphical representation, in accordance with one or more embodiments.

FIG. 8 illustrates an example method 800 that can facilitate modeling signal propagation from a signal point on a graphical representation, in accordance with one or more embodiments. For purposes of brevity, description of like elements and/or processes employed in other embodiments is omitted.

At 802, method 800 can comprise identifying a graphical representation of a layout of a geographic location, wherein the graphical representation comprises a first identified point on the layout, comprising a sample propagation point of a signal. At 804, method 800 can comprise sending, to second network equipment, a second identified point on the layout, comprising a sample signal receiving point. At 806, method 800 can comprise receiving, from the second network equipment, an estimated propagation of a signal applicable to a propagation of the signal from the first identified point to the second identified point, wherein the second network equipment estimated the propagation of the signal based on the graphical representation and a feature map for the geographic location generated by employing a neural network, and wherein the feature map comprises a map depicting estimates of the propagation of the signal at locations within the geographic location.

Figure 9:
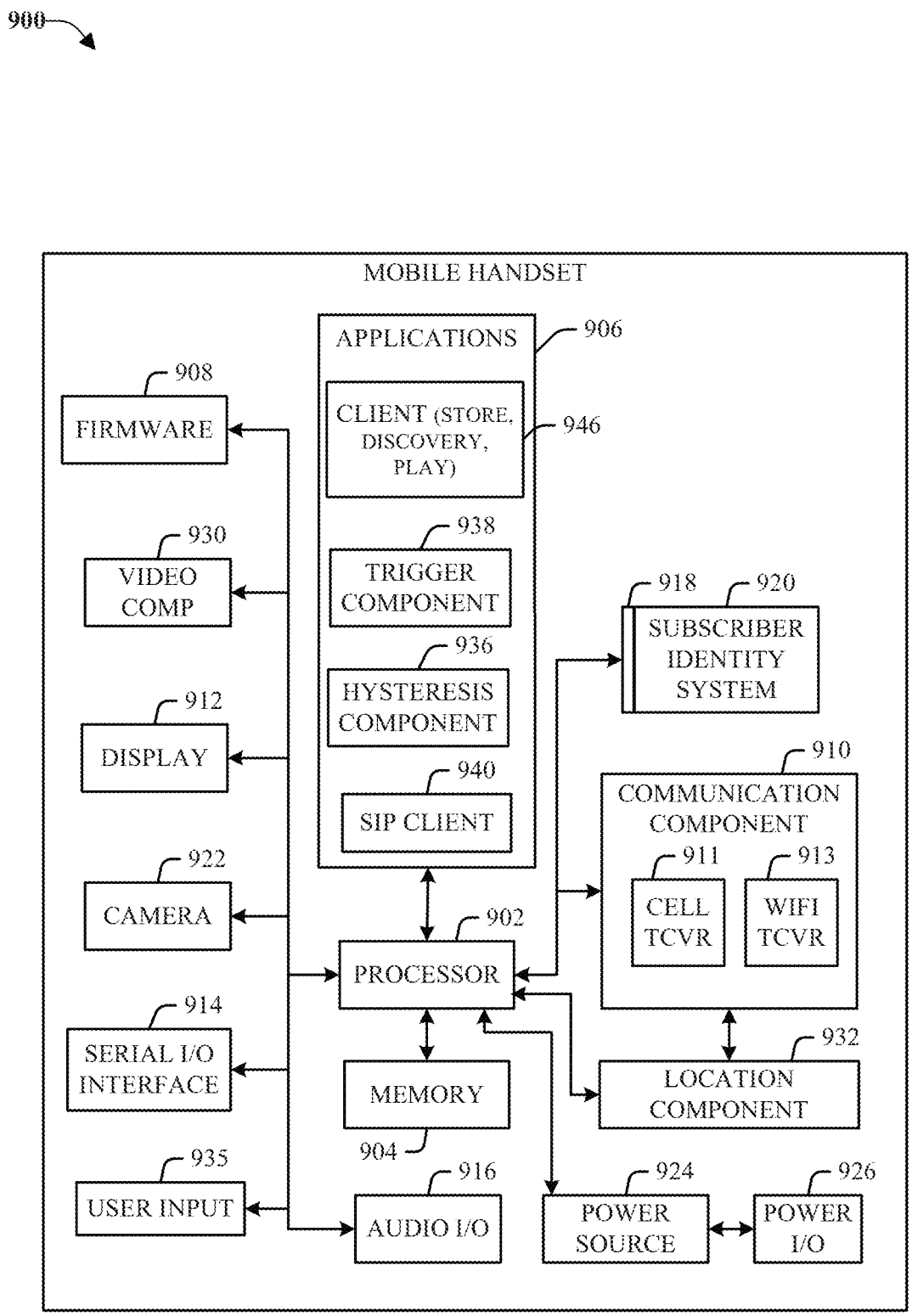
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
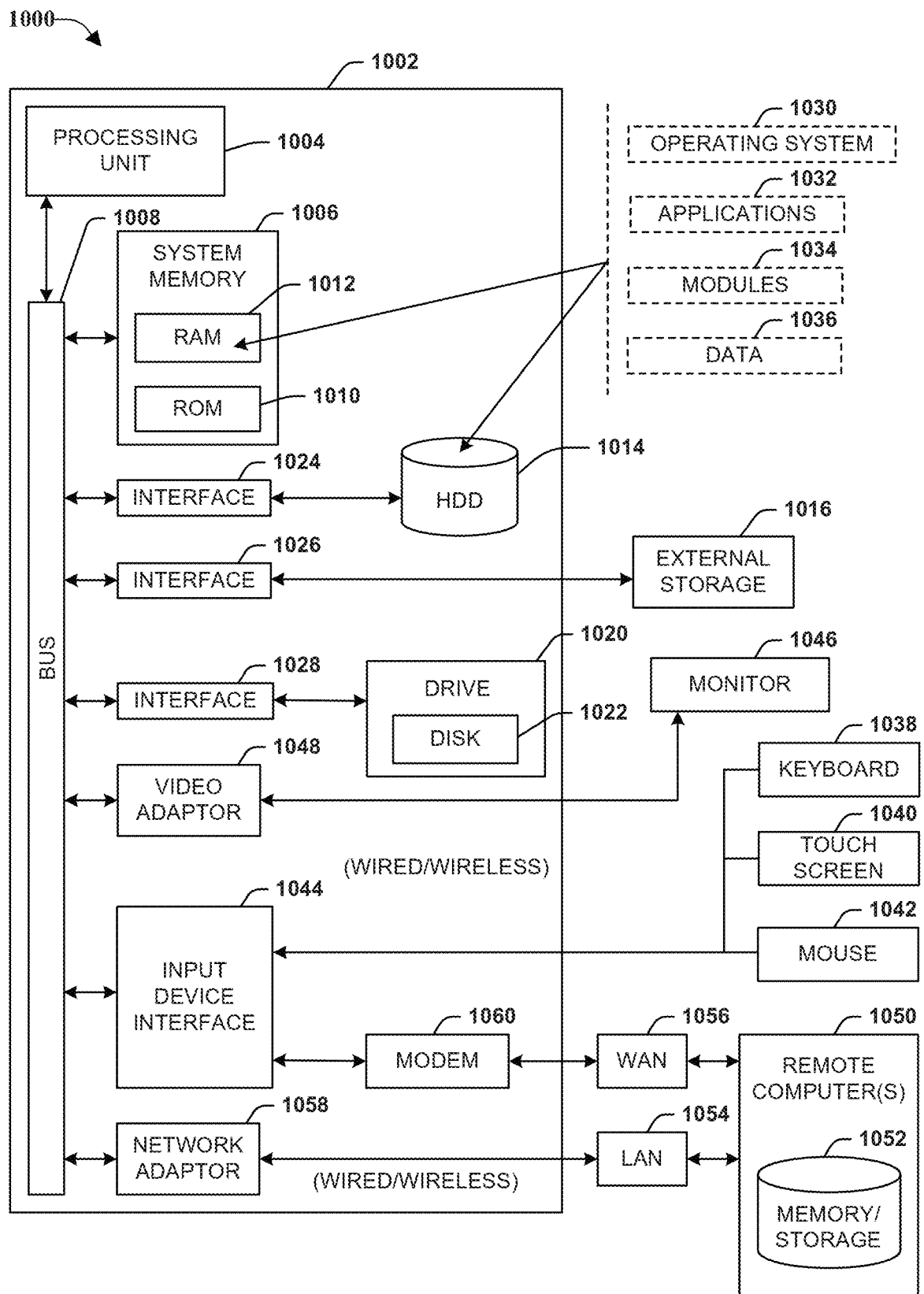
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25;

powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    based on a graphical representation of a layout of a geographic area, identifying, by equipment comprising a processor, a feature of the geographic area relevant to propagation of a signal propagated from a signal point on the layout, resulting in an identified feature; and
    based on the identified feature and the signal point, generating, by the equipment, a feature map for the geographic area by employing a neural network trained with training data, wherein the feature map comprises a map depicting estimates of the propagation of the signal at locations within the geographic area, wherein the training data of the neural network corresponds to:
        training of graphical representations based on the graphical representation, and
        training values determined based on indicated conditions that were indicated by the training of the graphical representations, and
        a convolutional neural network employed by a process comprising:
            based on the training values determined based on the indicated conditions, convoluting data corresponding to the graphical representation and the identified feature, resulting in a matrix of weighted values, and combining the matrix with the graphical representation, resulting in the feature map.

2. The method of claim 1, wherein the neural network comprises information organized based on a deep machine learning process.

3. The method of claim 1, wherein the training of the graphical representations comprises the training of the graphical representations similar to a composition of graphics of the graphical representation according to a defined similarity criterion, and
    wherein the training values comprise the training values corresponding to propagations of signals in the indicated conditions.

4. The method of claim 1, wherein convoluting the data comprises applying a filter based on the training values to convolute the data.

5. The method of claim 3, wherein the propagations of signals in the indicated conditions comprise signal measurements taken at respective locations corresponding to the indicated conditions.

6. The method of claim 3, wherein a training value of the training values is based on a general characteristic of propagation of signals.

7. The method of claim 1, further comprising
    based on the feature map and the graphical representation, estimating, by the equipment, the propagation of the signal propagated from the signal point, resulting in an estimated propagation of the signal; and
    based on the estimated propagation of the signal, estimating, by the equipment, a value corresponding to the propagation of the signal to an identified point on the layout.

8. The method of claim 1, wherein the graphical representation comprises an aerial photograph or a satellite photograph.

9. The method of claim 1, wherein the graphical representation comprises a symbolic depiction of the layout of the geographic area from an overhead perspective.

10. The method of claim 1, wherein the feature of the geographic area relevant to the propagation of the signal comprises a geographic information systems feature.

11. The method of claim 1, further comprising, based on the feature map, facilitating, by the equipment, locating signal propagation equipment at the signal point.

12. First network equipment, comprising:
    a processor; and
    a memory that stores executable instructions that, when executed by the processor, facilitate performance of operations, comprising:
        identifying a graphical representation of a layout of a geographic location, wherein the graphical representation comprises a first identified point on the layout, comprising a sample propagation point of a signal,
        sending, to second network equipment, a second identified point on the layout, comprising a sample signal receiving point, and
        receiving, from the second network equipment, an estimated propagation of a signal applicable to a propagation of the signal from the first identified point to the second identified point, wherein the second network equipment estimated the propagation of the signal based on the graphical representation and a feature map for the geographic location generated by employing a neural network trained with training data, resulting in an estimated propagation, and wherein the feature map comprises a map depicting the estimated propagation of the signal at identified locations within the geographic location, wherein the training data of the neural network corresponds to:
   training of graphical representations based on the graphical representation, and
   training values determined based on indicated conditions that were indicated by the training of the graphical representations, and
a convolutional neural network employed by the second network equipment by a process comprising:
   based on the indicated conditions, convoluting data corresponding to the graphical representation and the identified locations, resulting in a matrix of weighted values, and
   combining the matrix with the graphical representation, resulting in the feature map.

13. The first network equipment of claim 12, wherein the operations further comprise, based on the estimated propagation of the signal, facilitating locating signal propagation equipment at the first identified point.

14. The first network equipment of claim 12, wherein the training of the graphical representations comprises the training of the graphical representations determined to be similar to a composition of graphics of the graphical representation according to a first defined similarity criterion, and
   wherein the training values correspond to propagations of signals in conditions indicated by the training of the graphical representations.

15. The first network equipment of claim 14, wherein the training values further correspond to first metadata information similar to second metadata information about the signal that is relevant to the propagation of the signal, and wherein the feature map depicts the estimated propagation based on the graphical representation and the second metadata information.

16. The first network equipment of claim 15, wherein the second metadata information comprises weather information about the graphical representation of the geographic location.

17. The first network equipment of claim 15, wherein the second metadata information comprises information representative of a broadcast frequency and a strength of the signal.

18. A non-transitory machine-readable medium, comprising executable instructions that, when executed by a processor of a system, facilitate performance of operations, comprising:
   based on a satellite image associated with a geographic area, identifying a feature of the geographic area relevant to propagation of a signal propagated from a signal point on the satellite image, resulting in an identified feature; and
   based on the identified feature and the signal point, generating a feature map for the geographic area by employing a neural network, wherein the feature map comprises a map depicting estimates of the propagation of the signal at locations within the geographic area, wherein the neural network was trained based on a deep learning process with training data representative of:
      training graphical representations similar to composition of graphics of the satellite image according to a first defined similarity criterion, and
      training values corresponding to propagations of signals in conditions indicated by the training graphical representations, wherein the neural network is trained with training data corresponding to:
         training of graphical representations based on the graphical representation, and
         training values based on indicated conditions that were indicated by the training graphical representations, and
      a convolutional neural network employed by a process comprising:
         based on the indicated conditions, convoluting data corresponding to the graphical representation and the identified feature, resulting in a matrix of weighted values, and
         combining the matrix with the graphical representation, resulting in the feature map.

19. The non-transitory machine-readable medium of claim 18, wherein the operations further comprise:
   based on the feature map and the satellite image, estimating the propagation of the signal propagated from the signal point, resulting in an estimated propagation of the signal; and
   based on the estimated propagation of the signal, estimating a value corresponding to the propagation of the signal to a second identified point on the satellite image.

20. The non-transitory machine-readable medium of claim 18, wherein the neural network comprises a convolutional neural network.

* * * * *